(12) United States Patent
Senetar

(10) Patent No.: US 10,589,264 B2
(45) Date of Patent: Mar. 17, 2020

(54) PROCESSES FOR CONTROLLING THE PARTIAL REGENERATION OF SPENT CATALYST FROM AN MTO REACTION

(71) Applicant: UOP LLC, Des Plaines, IL (US)

(72) Inventor: John J. Senetar, Naperville, IL (US)

( * ) Notice: Subject to any disclaimer, the term of this patent is extended or adjusted under 35 U.S.C. 154(b) by 0 days.

(21) Appl. No.: 16/100,566

(22) Filed: Aug. 10, 2018

(65) Prior Publication Data

US 2020/0047174 A1 Feb. 13, 2020

(51) Int. Cl.
*B01J 38/14* (2006.01)
*B01J 38/18* (2006.01)
*B01J 19/00* (2006.01)

(52) U.S. Cl.
CPC ........... *B01J 38/14* (2013.01); *B01J 19/0006* (2013.01); *B01J 38/18* (2013.01); *B01J 2219/00182* (2013.01); *B01J 2219/00229* (2013.01)

(58) Field of Classification Search
CPC ........ B01J 38/14; B01J 38/18; B01J 19/0006; B01J 2219/00182; B01J 2219/00229
USPC ......................................................... 502/52
See application file for complete search history.

(56) References Cited

U.S. PATENT DOCUMENTS

| | | |
|---|---|---|
| 3,652,231 A | 3/1972 | Greenwood et al. |
| 3,928,483 A | 12/1975 | Chang et al. |
| 4,025,575 A | 5/1977 | Chang et al. |
| 4,040,945 A | 8/1977 | McKinney et al. |
| 4,052,479 A | 10/1977 | Chang et al. |
| 4,447,669 A | 5/1984 | Hamon et al. |
| 4,496,786 A | 1/1985 | Santilli et al. |
| 4,499,314 A | 2/1985 | Seddon et al. |
| 4,547,616 A | 10/1985 | Avidan et al. |
| 4,677,242 A | 6/1987 | Carlson et al. |
| 4,843,183 A | 6/1989 | Inui |
| 4,861,938 A | 8/1989 | Lewis et al. |
| 4,973,792 A | 11/1990 | Lewis et al. |
| 5,095,163 A | 3/1992 | Barger |
| 5,126,308 A | 6/1992 | Barger et al. |
| 5,191,141 A | 3/1993 | Barger et al. |
| 5,683,573 A | 11/1997 | Haizmann et al. |
| 6,166,282 A | 12/2000 | Miller |
| 7,307,679 B2 | 12/2007 | Toyooka et al. |
| 7,332,134 B2 | 2/2008 | Lattner |
| 7,423,191 B2 | 9/2008 | Senetar et al. |
| 8,859,835 B2 | 10/2014 | Clem et al. |
| 8,927,449 B2 | 1/2015 | Dziabis et al. |
| 9,643,897 B2 | 5/2017 | Jan |

FOREIGN PATENT DOCUMENTS

| | | |
|---|---|---|
| CN | 101811072 B | 12/2011 |
| CN | 102658214 B | 3/2014 |
| CN | 103120957 B | 11/2014 |

OTHER PUBLICATIONS

International Search Report and Written Opinion for corresponding International Application PCT/US2019/046149—dated Nov. 28, 2019—Russian references on list have been cited with corresponding US patents.

*Primary Examiner* — Edward M Johnson

(57) ABSTRACT

A method of controlling the regeneration of spent catalyst from an oxygenate-to-olefin reaction zone in order to provide a partially regenerated catalyst. The partially regenerated catalyst has between 1 to 4, or 1 to 3, or, 2 to 3 wt % coke. The regeneration is controlled by adjusting a ratio of air to recycled flue gas in the combustion gas passed to the regeneration zone. CO in the flue gas is removed in a CO oxidation zone which receives oxygen to oxidize CO to $CO_2$.

20 Claims, 1 Drawing Sheet

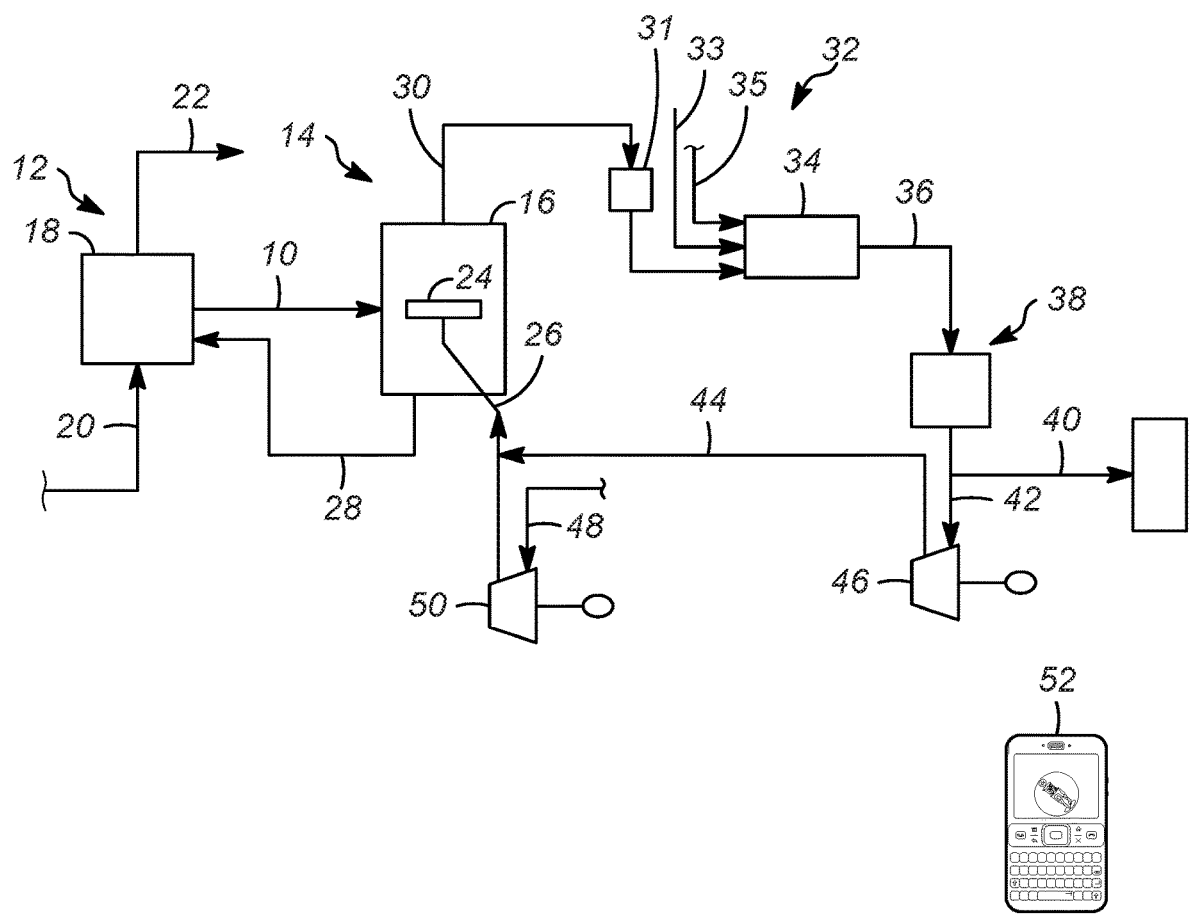

PROCESSES FOR CONTROLLING THE PARTIAL REGENERATION OF SPENT CATALYST FROM AN MTO REACTION

FIELD OF THE INVENTION

This invention relates processes for controlling the regeneration of spent catalyst used in an oxygenate to olefin conversion process, and more specifically to processes which control various parameters to obtain partially regenerated catalyst with a desired amount of coke.

BACKGROUND OF THE INVENTION

Light olefins serve as feeds for the production of numerous chemicals and have traditionally been produced through the process of steam or catalytic cracking. However, due to the limited availability and high cost of petroleum sources, the cost of producing light olefins from such petroleum sources has been steadily increasing.

The search for alternative materials for light olefin production has led to the use of oxygenates such as alcohols and, more particularly, to the use of methanol, ethanol, and higher alcohols or their derivatives. Molecular sieves such as microporous crystalline zeolite and non-zeolitic catalysts, particularly silicoaluminophosphates (SAPO), are known to promote the conversion of oxygenates to hydrocarbon mixtures in a reactor. Numerous patents describe this process for various types of these catalysts: U.S. Pat. Nos. 3,928,483; 4,025,575; 4,052,479; 4,496,786; 4,547,616; 4,677,242; 4,843,183; 4,499,314; 4,447,669; 5,095,163; 5,191,141; 5,126,308; 4,973,792; 4,861,938; 7,309,679; and 9,643,897.

When a catalyst is exposed to oxygenates, such as methanol, to promote the reaction to olefins, carbonaceous material (coke) is generated and deposited on the catalyst. Accumulation of coke deposits interferes with the catalyst's ability to promote the reaction. As the amount of coke deposit increases, the catalyst loses activity and less of the feedstock is converted to the desired olefin product. The step of regeneration removes the coke from the spent catalyst by combustion with oxygen, restoring the catalytic activity of the catalyst. The regenerated catalyst may then be exposed again to oxygenates to promote the conversion to olefins.

Recently, it has been shown that partial regeneration of spent catalyst provides a selectivity advantage in a methanol to olefin (MTO) conversion process. Thus, it is believed that the amount of coke on regenerated catalyst can be adjusted to maximize light olefin yields based on various reactor condition.

Partial regeneration of MTO catalyst introduces challenges for control of the extent of regeneration. Fluidized bed regeneration requires a specific range of superficial velocity to achieve sufficient gas-solid contacting and recovery of entrained fines from the flue gas. Consequently, once a regenerator is designed, the amount of air supplied to the regenerator can only be controlled in a small range. Therefore, there is a need for processes which control the extent of regeneration of the catalyst to achieve the desired coke on the regenerated catalyst.

SUMMARY OF THE INVENTION

One or more processes have been invented for controlling the regeneration of spent catalyst to achieve a regenerated catalyst that includes some coke. As indicated above, the partial regeneration is desirable because of the improved selectivity towards light olefin production with a partially regenerated catalyst. In one or more processes of the present invention, the regeneration is controlled with the combustion gas by varying and adjusting an amount of fresh air combined with an amount of recycled flue gas that is recycled to the regeneration zone. One or more processing conditions in the regeneration zone, or the reactor, are monitored and the components of the combustion gas are adjusted in either a predictive or responsive manner.

Therefore, the present invention may be characterized, in at least one aspect, as providing a process for controlling catalyst regeneration in a catalyst regeneration zone by: introducing an oxygen containing gas into a catalyst regeneration zone; partially regenerating a stream of spent catalyst from an MTO reaction zone, the spent catalyst including coke; separating regenerated catalyst from a flue gas, the regenerated catalyst having a reduced amount of coke and the flue gas comprising carbon monoxide and carbon dioxide; recycling a portion of the flue gas to the catalyst regeneration zone with the oxygen containing gas; and, maintaining a ratio of carbon dioxide to carbon monoxide in the flue gas to be at least 0.5.

It is contemplated that the ratio of carbon dioxide to carbon monoxide is maintained by adjusting an oxygen content of the oxygen containing gas introduced into the catalyst regeneration zone. The oxygen content may be adjusted by controlling a ratio of air to flue gas the in oxygen containing gas. The ratio of carbon dioxide to carbon monoxide in the flue gas may be maintained to be greater than 2.

It is also contemplated that the flue gas further comprises oxygen, and the process further includes maintaining an amount of oxygen in the flue gas to be less than 2%, by volume.

It is further contemplated that the regenerated catalyst comprises between 1 to 4%, by weight, coke.

In another aspect, the present invention may be characterized as generally providing a process for controlling catalyst regeneration in a catalyst regeneration zone by: introducing an oxygen containing gas into a catalyst regeneration zone; partially regenerating a stream of spent catalyst from an MTO reaction zone, the spent catalyst including coke; separating regenerated catalyst from a flue gas, the regenerated catalyst having a reduced amount of coke and the flue gas comprising oxygen; recycling a portion of the flue gas to the catalyst regeneration zone with the oxygen containing gas; and, maintaining an amount of oxygen in the flue gas to be less than 2%, by volume.

It is contemplated the amount of oxygen in the flue gas is maintained by adjusting an oxygen content of the oxygen containing gas introduced into the catalyst regeneration zone. The oxygen content may be adjusted by controlling a ratio of air to flue gas in the oxygen containing gas.

It is also contemplated that the regenerated catalyst comprises between 1 to 4%, by weight, coke. The flue gas may comprise carbon dioxide and carbon monoxide, and the process may include maintaining a ratio of carbon dioxide to carbon monoxide in the flue gas to be at least 0.5. The ratio of carbon dioxide to carbon monoxide in the flue gas may be maintained to be greater than 2.

In still another aspect, the present invention may also generally be characterized as providing a process for partially regenerating catalyst from an MTO reaction zone by: passing a stream of oxygen containing gas into a catalyst regeneration zone; passing a stream of spent catalyst from an MTO reaction zone to the catalyst regeneration zone, the spent catalyst including coke; combusting coke off of the spent catalyst to provide a partially regenerated catalyst comprising between 1 to 4%, by weight, coke; recycling a portion of a flue gas stream to the catalyst regeneration zone as the oxygen containing gas; and, controlling a ratio of air to flue gas in the oxygen containing gas in order to achieve the partially regenerated catalyst by maintaining at least one of the following parameters: an amount of oxygen in the flue gas to be less than 2%, by volume; a ratio of carbon dioxide to carbon monoxide in the flue gas to be at least 0.5; or, an oxygen utilization in the catalyst regeneration zone of at least 90%.

It is contemplated that the ratio of carbon dioxide to carbon monoxide is maintained to be greater than 2.

It is further contemplated that the process includes adjusting a processing condition associated with the MTO reaction zone and, adjusting the ratio of air to flue gas in the oxygen containing gas in response to the adjusted processing condition of the MTO reaction zone.

It is also contemplated that the process includes at least one of: sensing at least one parameter of the process and generating a signal or data from the sensing; generating and transmitting a signal; or generating and transmitting data. The process may include receiving the signal or data and, adjusting the ratio of air to flue gas in response to the received data or signal.

It is contemplated that the ratio of air to flue gas in the oxygen containing gas is controlled in order to achieve the partially regenerated catalyst by maintaining at least two of the following parameters: an amount of oxygen in the flue gas to be less than 2%, by volume; a ratio of carbon dioxide to carbon monoxide in the flue gas to be at least 0.5; or, an oxygen utilization in the catalyst regeneration zone of at least 90%.

It is still further contemplated that the ratio of air to flue gas in the oxygen containing gas is controlled in order to achieve the partially regenerated catalyst by maintaining the following parameters: an amount of oxygen in the flue gas to be less than 2%, by volume; a ratio of carbon dioxide to carbon monoxide in the flue gas to be at least 0.5; and, an oxygen utilization in the catalyst regeneration zone of at least 90%.

It is also further contemplated the process includes adjusting the ratio of air to flue gas in the oxygen containing gas in order to maintain a constant velocity of spent catalyst particles within a reactor of the catalyst regeneration zone.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing FIGURE, in which the FIGURE shows a process flow diagram of an MTO reaction and catalyst regeneration according to one or more aspects of the present invention.

DETAILED DESCRIPTION OF THE INVENTION

As mentioned above, the present invention provides one or more processes for partially regenerating spent catalyst from an MTO reaction zone, and processes for controlling the partial regeneration. With these general principles in mind, one or more embodiments of the present invention will be described with the understanding that the following description is not intended to be limiting.

An exemplary MTO conversion process with a regeneration zone is shown in the FIGURE, in which a spent catalyst stream 10 is passed from an oxygenate reaction zone 12 to a regeneration zone 14 having a regenerator 16. The oxygenate reaction zone 12 preferably includes an MTO reactor 18 in which a feedstock 20 comprising methanol is contacted with a catalyst containing a molecular sieve under condition suitable for converting methanol to light olefins in an effluent stream 22. The catalyst may be silicoaluminophosphate (SAPO), having a tetrahedral unit framework forming numerous pores to best contact methanol feed during conversion to olefins.

The MTO conversion process may be a vapor phase, fluid catalytic process that converts methanol to olefins, primarily ethylene and propylene. The feedstock 20 may be commercial grade methanol, crude methanol or any combination of the two. Crude methanol may be an unrefined product from a methanol synthesis unit. A feedstock 20 with methanol and water blend may have methanol between about 65% and 100% by weight, or between about 78% and about 99% by weight, or about 95% methanol by weight. MTO reactors 18 are known in the art from, for example, U.S. Pat. Nos. 6,166,282 and 7,423,191, the entirety of which is incorporated herein by reference.

As discussed above, coke is often a byproduct of the MTO process that accumulates on the catalyst as a result of the contact with the compounds from the oxygenate-containing feedstock 20. As coke deposits accumulate on the catalyst, the catalyst's ability to convert the oxygenates, namely methanol, to olefins decreases. Therefore, a stream of spent catalyst 10 from the MTO reactor 18 may be regenerated to maintain the desired activity of the catalyst.

At least a portion of the spent catalyst may be continuously drawn out of oxygenate reaction zone 12 for regeneration in the stream of spent catalyst 10. Before the spent catalyst is regenerated, hydrocarbons may be stripped from the spent catalyst, and then the stripped, spent catalyst in stream 10 is passed to the regenerator 16 in the regeneration zone 14.

The regenerator 16 may be a bubbling or turbulent bed type of design which comprises a vessel containing a distributor 24 fed by a stream of combustion gas 26. The combustion gas 26, as discussed below, contains oxygen ($O_2$) or other oxidants. The regenerator 16 is operated under conditions so that as the spent catalyst contacts with the oxygen from the combustion gas 26, the coke from the spent catalyst is combusted as the spent catalyst passes upwardly in the regenerator 16. This results in producing regenerated catalyst (i.e., catalyst with a lower amount of coke). Suitable conditions for the regenerator 16 are known and may include a pressure of approximately 255 kPa (37 psig) and a temperature of 650° C. (1202° F.).

After separating regenerated catalyst from any entrained gas, the regenerated catalyst falls to the bottom of the regenerator, where further gases may be stripped and then a stream of regenerated catalyst 28 may be passed back to the oxygenate reaction zone 12. An exemplary regenerator 16 is described in more detail in U.S. Pat. No. 7,423,191.

As mentioned above, the regenerated catalyst 28 is preferably a partially regenerated catalyst, meaning that while the amount of coke on the spent catalyst is reduced, the regenerated catalyst 28 passed back to the oxygenate reaction zone 12 comprises, on average, between 1 to 4 wt %, or 1 to 3 wt %, or 2 to 3 wt % coke. The regenerated catalyst 28 may include between 3 to 15 wt % coke on the active component of the regenerated catalyst 28 if active component is SAPO-34, SAPO-18, ZSM-5, etc. etc. etc. Accordingly, the present invention provides processes for controlling the regenerator 16 to achieve the desired partial level of regeneration by controlling a mixture of recycle gas from the flue gas of the regenerator 16 and (fresh) air used as the combustion gas 26 in order to obtain or maintain one or more operating conditions for the regenerator 16.

The flue gas of the regenerator 16 comprises nitrogen ($N_2$), oxygen ($O_2$), carbon monoxide (CO), carbon dioxide ($CO_2$), and water ($H_2O$). An exemplary flue gas may have the following composition, by volume: 72.7% $N_2$; 11.6% $H_2O$; 10.2% $CO_2$; 4.4% CO; and 1.0% $O_2$. However, prior to introducing the flue gas back to the regenerator, the CO should be removed from the flue gas.

Accordingly, as shown in the FIGURE, a stream of flue gas 30 from the regenerator 16 may pass through a control valve 31 to lower the pressure of the flue gas, and then be passed to a CO oxidation zone 32. The CO oxidation zone 32 typically includes a burner 34 supplied with auxiliary fuel 33 and air 35 so as to sufficiently oxidize most, if not all, of the CO in the flue gas stream 30. Alternatively, the CO oxidation zone 32 may include a vessel containing a catalyst that promotes combustion of CO to $CO_2$.

The CO oxidation zone 32 reduces the amount of CO being recycled to the regenerator 16. Additionally, the CO oxidation zone 32 facilitates heat recovery from the flue gas 30. If CO is recycled back to the regenerator 16, oxygen is consumed in the regenerator to burn the CO to $CO_2$. This requires both a higher oxygen requirement for the regenerator 16 resulting in a higher flow rate of combustion air and a larger regenerator with increased heat removal from the regenerator 16 to control the regenerator temperature. Accordingly, removal of the CO from the flue gas 30 in the CO oxidation zone 32 improves the ability to use the flue gas 30 as a recycle to the regenerator 16. Oxygen, provided in air stream 35, is introduced to the CO oxidation zone 32 to provide oxygen for the conversion of CO to $CO_2$.

A CO-lean flue gas stream 36 is recovered from the CO-oxidation zone 32 and may be passed to a filtration zone 38 configured to remove catalyst fines from the CO-lean flue gas stream 36. A portion 40 of a gaseous stream from the filtration zone 38 may be vented, while a second portion 42 of the gaseous stream may be used as a recycle stream 44 for the combustion gas 26 passed to the regenerator 16. Specifically, the second stream 42 is passed to a blower 46 to control the volume of recycle stream 44 passed back to the regenerator 16. The recycle stream 44 is mixed with a stream of fresh air 48, also provided by a blower 50, to form the combustion gas stream 26.

As mentioned above, in various aspects of the present processes, the control of catalyst regeneration is achieved by adjusting and varying the ratio of air 48 to recycle stream 44 in the combustion gas stream 26. This ratio is controlled by adjusting the conditions of one or both of the blowers 46, 50 which may be in communication, either wired or wireless, with a computer 52. The adjustments, for example, may include manipulation of valves at the inlet and/or outlet of the blowers 46, 50, or may include control of the blower speed, or other means to vary flow rate while maintaining sufficient pressure.

According to one or more processes, the ratio of air 48 to recycle stream 44 in the combustion gas stream 26 is controlled in order to achieve, maintain, or both a $CO_2$/CO ratio in the flue gas 30 greater than 0.5 (i.e., 1:2), preferably greater than 2 (i.e., 2:1). A $CO_2$/CO ratio greater than 0.5, or greater than 2 is believed to reduce, or in some cases prevent, excessive temperature rise (afterburn) in gas phase with reduced catalyst downstream of the fluidized bed in the regenerator 16.

Similarly, in one or more processes the ratio of air 48 to recycle stream 44 in the combustion gas stream 26 is controlled in order to achieve, maintain, or both an oxygen concentration in the flue gas 30 of less than 2 vol %. This concentration is also believed to reduce, or in some instances prevent, excessive temperature rise (afterburn) in the downstream reduced catalyst.

The ratio of air 48 to recycle stream 44 in the combustion gas stream 26 is controlled in order to achieve, maintain, or an oxygen utilization of 90% or greater. "Oxygen utilization" is the fraction of oxygen consumed across the regenerator fluidized bed.

In some processes, the ratio of air 48 to recycle stream 44 is controlled or adjusted to achieve both a desired $CO_2$/CO ratio, as well as a desired oxygen concentration or desired oxygen utilization.

Additionally, in one or more processes, the ratio of air 48 to recycle stream 44 in the combustion gas stream 26 may be controlled in order to achieve, maintain, or both constant fluidization velocity of the spent catalyst in the regenerator 16. For example, the amount of air 48 in the combustion gas stream 26 may be decreased while the amount of recycle stream 44 in the combustion gas stream 26 is increased to provide a stream with less oxygen while maintaining the desired velocity of the spent catalyst rising within the regenerator 16. The velocity of the spent catalyst will impact not only the residence time of the spent catalyst in the combustion zone of the regenerator 16, but also the height of the catalyst bed, as well as the temperature of the regenerator 16.

According to the present processes, the ratio of air 48 to recycle stream 44 in the combustion gas stream 26 may be adjusted based on a change in a processing condition associated with the MTO reactor 18. In other words, while some processes may measure the temperature, flue gas composition, etc. to adjust or maintain the ratio of air 48 to recycle stream 44, it is also contemplated that the ratio of air 48 to recycle stream 44 is adjusted prior to measuring or obtaining certain processing conditions. For example, based on a change in the composition or flow rate of the feedstock 20, the ratio of air 48 to recycle stream 44 may be adjusted. Similarly, the temperature of the MTO reactor 18 may be adjusted. At the same time, the ratio of air 48 to recycle stream 44 is adjusted in a predictive manner to counter the temperature and flow rate changes in the MTO reactor 18.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems, such as computer 52. Computing devices or systems and computer 52 may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment or associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for controlling catalyst regeneration in a catalyst regeneration zone, the process comprising introducing an oxygen containing gas into a catalyst regeneration zone; partially regenerating a stream of spent catalyst from an MTO reaction zone, the spent catalyst including coke; separating regenerated catalyst from a flue gas, the regenerated catalyst having a reduced amount of coke and the flue gas comprising carbon monoxide and carbon dioxide; recycling a portion of the flue gas to the catalyst regeneration zone with the oxygen containing gas; and, maintaining a ratio of carbon dioxide to carbon monoxide in the flue gas to be at least 0.5. An embodiment of the invention is one, any or all of prior embodiments in this paragraph up through the first embodiment in this paragraph, wherein the ratio of carbon dioxide to carbon monoxide is maintained by adjusting an oxygen content of the oxygen containing gas introduced into the catalyst regeneration zone. An embodiment of the invention is one, any or all of prior embodiments in this paragraph up through the first embodiment in this paragraph, wherein the oxygen content is adjusted by controlling a ratio of air to flue gas the in oxygen containing gas. An embodiment of the invention is one, any or all of prior embodiments in this paragraph up through the first embodiment in this paragraph, wherein the ratio of carbon dioxide to carbon monoxide in the flue gas is maintained to be greater than 2. An embodiment of the invention is one, any or all of prior embodiments in this paragraph up through the first embodiment in this paragraph, wherein the flue gas further comprises oxygen, and wherein the process further comprises maintaining an amount of oxygen in the flue gas to be less than 2%, by volume. An embodiment of the invention is one, any or all of prior embodiments in this paragraph up through the first embodiment in this paragraph, wherein the regenerated catalyst comprises between 1 to 4%, by weight, coke.

A second embodiment of the invention is a process for controlling catalyst regeneration in a catalyst regeneration zone, the process comprising introducing an oxygen containing gas into a catalyst regeneration zone; partially regenerating a stream of spent catalyst from an MTO reaction zone, the spent catalyst including coke; separating regenerated catalyst from a flue gas, the regenerated catalyst having a reduced amount of coke and the flue gas comprising oxygen; recycling a portion of the flue gas to the catalyst regeneration zone with the oxygen containing gas; and, maintaining an amount of oxygen in the flue gas to be less than 2%, by volume. An embodiment of the invention is one, any or all of prior embodiments in this paragraph up through the second embodiment in this paragraph, wherein the amount of oxygen in the flue gas is maintained by adjusting an oxygen content of the oxygen containing gas introduced into the catalyst regeneration zone. An embodiment of the invention is one, any or all of prior embodiments in this paragraph up through the second embodiment in this paragraph, wherein the oxygen content is adjusted by controlling a ratio of air to flue gas in the oxygen containing gas. An embodiment of the invention is one, any or all of prior embodiments in this paragraph up through the second embodiment in this paragraph, wherein the regenerated catalyst comprises between 1 to 4%, by weight, coke. An embodiment of the invention is one, any or all of prior embodiments in this paragraph up through the second embodiment in this paragraph, wherein the flue gas further comprises carbon dioxide and carbon monoxide, and wherein the process further comprises maintaining a ratio of carbon dioxide to carbon monoxide in the flue gas to be at least 0.5. An embodiment of the invention is one, any or all of prior embodiments in this paragraph up through the second embodiment in this paragraph, wherein the ratio of carbon dioxide to carbon monoxide in the flue gas is maintained to be greater than 2.

A third embodiment of the invention is a process for partially regenerating catalyst from an MTO reaction zone, the process comprising passing a stream of oxygen containing gas into a catalyst regeneration zone; passing a stream of spent catalyst from an MTO reaction zone to the catalyst regeneration zone, the spent catalyst including coke; combusting coke off of the spent catalyst to provide a partially regenerated catalyst comprising between 1 to 4%, by weight, coke; recycling a portion of a flue gas stream to the catalyst regeneration zone as the oxygen containing gas; controlling a ratio of air to flue gas in the oxygen containing gas in order to achieve the partially regenerated catalyst by maintaining at least one of the following parameters an amount of oxygen in the flue gas to be less than 2%, by volume; a ratio of carbon dioxide to carbon monoxide in the flue gas to be at least 0.5; or, an oxygen utilization in the catalyst regeneration zone of at least 90%. An embodiment of the invention is one, any or all of prior embodiments in this paragraph up through the third embodiment in this paragraph wherein the ratio of carbon dioxide to carbon monoxide is maintained to be greater than 2. An embodiment of the invention is one, any or all of prior embodiments in this paragraph up through the third embodiment in this paragraph further comprising adjusting a processing condition associated with the MTO reaction zone; and, adjusting the ratio of air to flue gas in the oxygen containing gas in response to the adjusted processing condition of the MTO reaction zone. An embodiment of the invention is one, any or all of prior embodiments in this paragraph up through the third embodiment in this paragraph further comprising at least one of sensing at least one parameter of the process and generating a signal or data from the sensing; generating and transmitting a signal; or generating and transmitting data. An embodiment of the invention is one, any or all of prior embodiments in this paragraph up through the third embodiment in this paragraph further comprising receiving the signal or data; and, adjusting the ratio of air to flue gas in response to the received data or signal. An embodiment of the invention is one, any or all of prior embodiments in this paragraph up through the third embodiment in this paragraph wherein the ratio of air to flue gas in the oxygen containing gas is controlled in order to achieve the partially regenerated catalyst by maintaining at least two of the following parameters an amount of oxygen in the flue gas to be less than 2%, by volume; a ratio of carbon dioxide to carbon monoxide in the flue gas to be at least 0.5; or, an oxygen utilization in the catalyst regeneration zone of at least 90%. An embodiment of the invention is one, any or all of prior embodiments in this paragraph up through the third embodiment in this paragraph wherein the ratio of air to flue gas in the oxygen containing gas is controlled in order to achieve the partially regenerated catalyst by maintaining the following parameters an amount of oxygen in the flue gas to be less than 2%, by volume; a ratio of carbon dioxide to carbon monoxide in the flue gas to be at least 0.5; and, an oxygen utilization in the catalyst regeneration zone of at least 90%. An embodiment of the invention is one, any or all of prior embodiments in this paragraph up through the third embodiment in this paragraph further comprising adjusting the ratio of air to flue gas in the oxygen containing gas in order to maintain a constant velocity of spent catalyst particles within a reactor of the catalyst regeneration zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for controlling catalyst regeneration in a catalyst regeneration zone, the process comprising:
   introducing an oxygen containing gas into a catalyst regeneration zone;
   partially regenerating a stream of spent catalyst from an MTO reaction zone, the spent catalyst including coke;
   separating regenerated catalyst from a flue gas, the regenerated catalyst having a reduced amount of coke and the flue gas comprising carbon monoxide and carbon dioxide;
   recycling a portion of the flue gas to the catalyst regeneration zone with the oxygen containing gas; and,
   maintaining a ratio of carbon dioxide to carbon monoxide in the flue gas to be at least 0.5.

2. The process of claim 1, wherein the ratio of carbon dioxide to carbon monoxide is maintained by adjusting an oxygen content of the oxygen containing gas introduced into the catalyst regeneration zone.

3. The process of claim 2, wherein the oxygen content is adjusted by controlling a ratio of air to flue gas the in oxygen containing gas.

4. The process of claim 1, wherein the ratio of carbon dioxide to carbon monoxide in the flue gas is maintained to be greater than 2.

5. The process of claim 1, wherein the flue gas further comprises oxygen, and wherein the process further comprises:
   maintaining an amount of oxygen in the flue gas to be less than 2%, by volume.

6. The process of claim 1, wherein the regenerated catalyst comprises between 1 to 4%, by weight, coke.

7. A process for controlling catalyst regeneration in a catalyst regeneration zone, the process comprising:
   introducing an oxygen containing gas into a catalyst regeneration zone;
   partially regenerating a stream of spent catalyst from an MTO reaction zone, the spent catalyst including coke;
   separating regenerated catalyst from a flue gas, the regenerated catalyst having a reduced amount of coke and the flue gas comprising oxygen;
   recycling a portion of the flue gas to the catalyst regeneration zone with the oxygen containing gas; and,
   maintaining an amount of oxygen in the flue gas to be less than 2%, by volume.

8. The process of claim 7, wherein the amount of oxygen in the flue gas is maintained by adjusting an oxygen content of the oxygen containing gas introduced into the catalyst regeneration zone.

9. The process of claim 8, wherein the oxygen content is adjusted by controlling a ratio of air to flue gas in the oxygen containing gas.

10. The process of claim 7, wherein the regenerated catalyst comprises between 1 to 4%, by weight, coke.

11. The process of claim 10, wherein the flue gas further comprises carbon dioxide and carbon monoxide, and wherein the process further comprises:
   maintaining a ratio of carbon dioxide to carbon monoxide in the flue gas to be at least 0.5.

12. The process of claim 11, wherein the ratio of carbon dioxide to carbon monoxide in the flue gas is maintained to be greater than 2.

13. A process for partially regenerating catalyst from an MTO reaction zone, the process comprising:
   passing a stream of oxygen containing gas into a catalyst regeneration zone;
   passing a stream of spent catalyst from an MTO reaction zone to the catalyst regeneration zone, the spent catalyst including coke;
   combusting coke off of the spent catalyst to provide a partially regenerated catalyst comprising between 1 to 4%, by weight, coke;
   recycling a portion of a flue gas stream to the catalyst regeneration zone as the oxygen containing gas;

controlling a ratio of air to flue gas in the oxygen containing gas in order to achieve the partially regenerated catalyst by maintaining at least one of the following parameters:
an amount of oxygen in the flue gas to be less than 2%, by volume;
a ratio of carbon dioxide to carbon monoxide in the flue gas to be at least 0.5; or, an oxygen utilization in the catalyst regeneration zone of at least 90%.

14. The process of claim 13 wherein the ratio of carbon dioxide to carbon monoxide is maintained to be greater than 2.

15. The process of claim 13 further comprising:
adjusting a processing condition associated with the MTO reaction zone; and,
adjusting the ratio of air to flue gas in the oxygen containing gas in response to the adjusted processing condition of the MTO reaction zone.

16. The process of claim 13 further comprising at least one of:
sensing at least one parameter of the process and generating a signal or data from the sensing;
generating and transmitting a signal; or
generating and transmitting data.

17. The process of claim 16 further comprising:
receiving the signal or data; and,
adjusting the ratio of air to flue gas in response to the received data or signal.

18. The process of claim 13 wherein the ratio of air to flue gas in the oxygen containing gas is controlled in order to achieve the partially regenerated catalyst by maintaining at least two of the following parameters:
an amount of oxygen in the flue gas to be less than 2%, by volume;
a ratio of carbon dioxide to carbon monoxide in the flue gas to be at least 0.5; or,
an oxygen utilization in the catalyst regeneration zone of at least 90%.

19. The process of claim 13 wherein the ratio of air to flue gas in the oxygen containing gas is controlled in order to achieve the partially regenerated catalyst by maintaining the following parameters:
an amount of oxygen in the flue gas to be less than 2%, by volume;
a ratio of carbon dioxide to carbon monoxide in the flue gas to be at least 0.5; and,
an oxygen utilization in the catalyst regeneration zone of at least 90%.

20. The process of claim 13 further comprising:
adjusting the ratio of air to flue gas in the oxygen containing gas in order to maintain a constant velocity of spent catalyst particles within a reactor of the catalyst regeneration zone.

* * * * *